R. E. ALPI.
MACHINE FOR RENDERING FUR SKINS PLIABLE.
APPLICATION FILED NOV. 27, 1917.
1,279,376.
Patented Sept. 17, 1918.
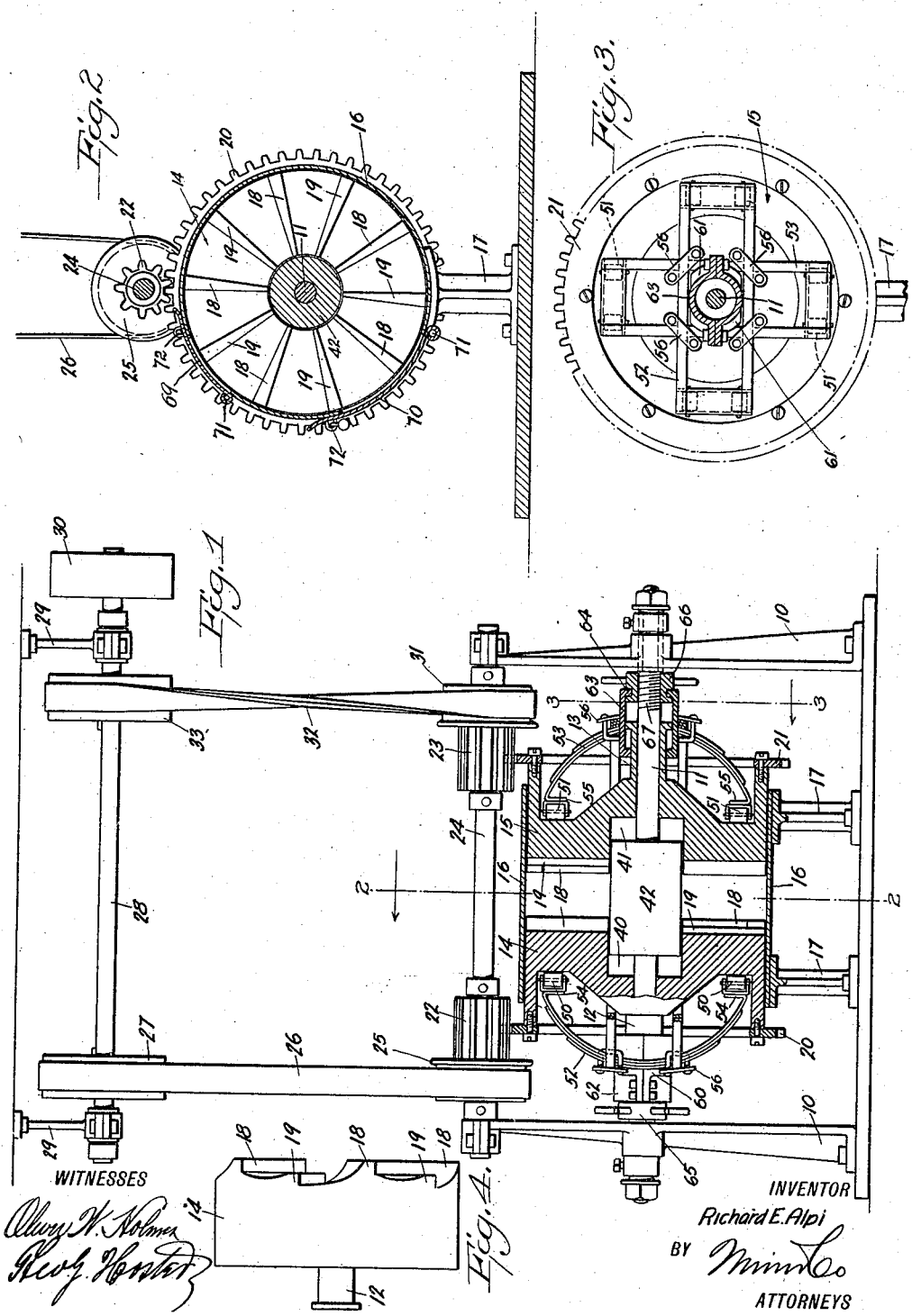
WITNESSES
INVENTOR
Richard E. Alpi
BY
ATTORNEYS

UNITED STATES PATENT OFFICE.

RICHARD E. ALPI, OF NEW YORK, N. Y.

MACHINE FOR RENDERING FUR-SKINS PLIABLE.

1,279,376.  Specification of Letters Patent.  Patented Sept. 17, 1918.

Application filed November 27, 1917. Serial No. 204,172.

*To all whom it may concern:*

Be it known that I, RICHARD E. ALPI, a citizen of the United States, and a resident of the city of New York, Richmond Hill, borough of Queens, in the county of Queens and State of New York, have invented a new and Improved Machine for Rendering Fur-Skins Pliable, of which the following is a full, clear, and exact description.

The invention relates to the treatment of fur skins while in the raw state and while undergoing the process of dressing and dyeing.

The object of the invention is to provide a new and improved machine more especially designed for rendering fur skins pliable to allow proper dressing or dyeing of the same.

In order to accomplish the desired result, use is made of revoluble rubbing members having a common axis and yielding toward and from each other, the opposite faces of the kneading members having projecting kneading elements, and the opposite faces being spaced apart to receive a fur skin between the kneading elements.

A practical embodiment of the invention is represented in the accompanying drawings forming a part of this specification, in which similar characters of reference indicate corresponding parts in all the views.

Figure 1 is a sectional front elevation of the machine for rendering fur skins pliable;

Fig. 2 is a transverse section of the same on the line 2—2 of Fig. 1;

Fig. 3 is a similar view of the same on the line 3—3 of Fig. 1; and

Fig. 4 is a side elevation of one of the rubbing members.

The improved machine for rendering fur skins pliable is mounted on a suitably constructed frame 10 in which is secured a shaft 11 engaged by the hubs 12 and 13 of kneading members 14 and 15, preferably in the form of wheels, rotating within a drum 16 secured on standards 17 attached to or forming part of the main frame 10. The kneading members 14 and 15 have their opposite faces spaced apart and provided with kneading or rubbing elements 18, 19, in the form of radially disposed teeth or projections of different height and arranged alternately, as plainly indicated in the drawings.

The kneading members 14 and 15 are simultaneously rotated in opposite directions, and for this purpose the outer ends of the kneading members are provided with gear wheels 20 and 21 in mesh with pinions 22, 23 mounted to rotate loosely on a shaft 24 attached to the upper portion of the main frame 10. The pinion 22 is provided with a pulley 25 connected by a belt 26 with a pulley 27 secured on a shaft 28 journaled in hangers 29 attached to a ceiling or other suitable support. On the shaft 28 is secured a pulley 30 connected by a belt with other machinery for imparting a rotary motion to the shaft 28. The pinion 23 is provided with a pulley 31 connected by a crossed belt 32 with a pulley 33 secured on the shaft 28 so that when the latter is rotated a rotary motion is transmitted by the gearing described to the kneading members 14 and 15 to rotate the same in opposite directions.

By reference to Fig. 1, it will be noticed that the pinions 22 and 23 are of suitable width to allow the kneading members 14 and 15 to slide independently one of the other in the direction of the common axis of the kneading members 14 and 15 without disengaging the gear wheels 20 and 21 from the pinions 22, 23.

The opposite faces of the kneading members 14 and 15 are provided with central recesses 40 and 41 into which project the ends of an enlargement or collar 42 attached to or forming part of the fixed shaft 11. The inner ends of the teeth 18, 19 terminate at the recesses 40 and 41 and hence adjacent the peripheral face of the enlargement or collar 42, which latter, together with the drum 16 and the opposite faces of the kneading members 14 and 15, provides an annular chamber for the reception of the fur skin to be rendered pliable at the time. It will also be noticed that the enlargement or collar 42 limits the movement of the kneading members 14 and 15 toward each other, the arrangement being such that when the opposite teeth 18 are close together the ends of the enlargement or carrier 42 are engaged by the end walls of the recesses 40 and 41.

The kneading members 14 and 15 are free to yield toward and from each other and for this purpose the outer faces of the kneading members 14 and 15 are engaged by sets of friction rollers 50 and 51 mounted on sets of springs 52, 53, each set preferably in the form of two pairs of leaf springs disposed at a right angle, one pair relative to the other, as plainly indicated in Fig. 3. The ends of the springs of each pair are connected with each other by flanges 54, 55, on which the friction rollers 50 and 51 are journaled to bear against the outer faces of the kneading members 14 and 15 with a view to move said members toward each other. The pairs of springs 52 or 53 are fastened together by suitable clips 56 and the pairs of springs are engaged by projections 60 and 61 formed on tension adjusting collars 62, 63 mounted to slide lengthwise on the hubs 12 and 13 of the kneading members 14 and 15. The outer ends of the collars 62, 63 are provided with inwardly extending flanges 64 engaged by nuts 65, 66 screwing on threaded portions 67 of the shaft 11 to shift the collars 62, 63 inward or outward according to the direction in which the nuts 65 and 66 are turned by the operator. It will be noticed that when the nuts 65, 66 are screwed inwardly then an inward movement is given to the collars 62, 63 to increase the tension of the springs 52, 53, and when the nuts 65, 66 are screwed outwardly then the collars 62, 63 are correspondingly moved in an outward direction to decrease the tension of the said springs 52, 53. It is understood that the tension of the springs 52, 53 is adjusted according to the nature of the fur skin to be rendered pliable at the time, that is, for very stiff, heavy skins it is necessary to give more tension to the springs than for skins which are lighter and less stiff.

The drum previously mentioned is open at its ends and is provided at or near the top with a filling door 69 for loading the skins into the machine, and the drum is also provided at or near the bottom with an unloading door 70, each of the doors 69 and 70 being preferably hinged at one end at 71 (see Fig. 2) and fastened in place at its other end by a suitable fastening device 72, such as a staple and lock, to hold each door normally in closed position.

The operation is as follows:

The door 69 is opened for placing a skin or skins in the annular space between the kneading members 14 and 15, and after the skins are placed in position the door is closed and then the shaft 28 is rotated to rotate the kneading members 14 and 15 in opposite directions, as previously explained. It will be noticed that the springs 52, 53 press the kneading members 14 and 15 toward each other so that the teeth 18 and 19 of the kneading members act on the skin or skins thus repeatedly bending the skins in order to render the same pliable.

It is understood that the members 18 and 19 of the revoluble elements 14 and 15 cause the skins to turn or roll around in the drum 16 and one past the other, and at the same time subject the skins to a kneading action by rubbing and pressing the skins one against the other thereby producing frictional heat which assists in rendering the skins pliable in a comparatively short time.

It will be noticed that by having the teeth or projections 18 and 19 disposed alternately and of different height, it is evident that considerable space is provided for the skin to bend into while subjected to the kneading action of the elements 14 and 15 in opposite directions. The kneading action produced by the two oppositely disposed rotating kneading members 14 and 15 tends to render the skins very pliable in a comparatively short time, and when the skins have been rendered pliable to the desired degree then the machine is stopped and the door 70 is opened to permit removal of the skins. From the foregoing it will be seen that the skins are rendered pliable without any attention on the part of the operator.

The machine shown and described is very simple in construction and its parts are not liable to get easily out of order.

Having thus described my invention, I claim as new and desire to secure by Letters Patent:—

1. A machine for rendering fur skins pliable, comprising a pair of revoluble kneading members having a common axis and yielding toward and from each other, the opposite faces of the kneading members having kneading elements and being spaced apart to secure the skin between the kneading elements.

2. A machine for rendering fur skins pliable, comprising a pair of kneading members spaced apart and provided at their opposite faces with projections receiving the skin between them, a shaft on which the said kneading members are mounted to turn and to slide lengthwise thereof, means rotating the kneading members in opposite directions, and pressure means moving the kneading members toward each other.

3. A machine for rendering fur skins pliable, comprising a pair of kneading members spaced apart and provided at their opposite faces with projections receiving the skin between them, a shaft on which the said kneading members are mounted to turn and to slide lengthwise thereof, means rotating the kneading members in opposite directions, pressure means moving the kneading members toward each other, and means limiting the motion of the kneading members toward each other.

4. A machine for rendering fur skins pliable, comprising a pair of kneading members spaced apart and provided at their opposite faces with projections receiving the skin between them, a shaft on which the said kneading members are mounted to turn and to slide lengthwise thereof, the said shaft having an abutment to limit the sliding motion of the kneading members toward each other, means rotating the said kneading members in opposite directions, and springs pressing the kneading members toward each other.

5. A machine for rendering fur skins pliable, comprising kneading wheels spaced apart and provided at their opposite faces with kneading projections receiving a skin between them, the said kneading wheels having a common axis, means for rotating the said kneading wheels simultaneously in opposite directions, and springs pressing the kneading wheels toward each other and independently one of the other.

6. A machine for rendering fur skins pliable, comprising a pair of rubbing members spaced apart and provided at their opposite faces with projections receiving the skin between them, a shaft on which the said kneading members are mounted to turn and to slide lengthwise thereof, the said shaft having an enlarged portion and the opposite faces of the kneading wheels having recesses into which extend the ends of the said enlarged shaft portion to limit the sliding motion of the kneading wheels toward each other, springs held on the said shaft and bearing against the outer faces of the kneading wheels to move the latter toward each other, and means turning the said kneading wheels.

7. A machine for rendering fur skins pliable, comprising a pair of kneading members spaced apart and provided at their opposite faces with projections receiving the skin between them, a shaft on which the said kneading members are mounted to turn and to slide lengthwise thereof, the said shaft having an enlarged portion and the opposite faces of the kneading members having recesses into which extend the ends of the said enlarged shaft portion to limit the sliding motion of the kneading members toward each other, springs held on the said shaft and bearing against the outer faces of the kneading members to move the latter toward each other, gear wheels on the said kneading members, and pinions driven in opposite directions and in mesh with the said gear wheels to rotate the said kneading members in opposite directions.

8. A machine for rendering fur skins pliable, comprising a drum, kneading wheels mounted to rotate in opposite directions in the said drum, the said kneading wheels being spaced apart and having their opposite faces provided with kneading members, means pressing the said kneading wheels toward each other, and means rotating the kneading wheels in opposite directions.

9. A machine for rendering fur skins pliable, comprising a drum, kneading wheels mounted to rotate in opposite directions in the said drum, the said kneading wheels being spaced apart and having their opposite faces provided with kneading members in the form of alternately arranged radial teeth of different depth, means pressing the said kneading wheels toward each other, and means rotating the kneading wheels in opposite directions.

RICHARD E. ALPI.

Copies of this patent may be obtained for five cents each, by addressing the "Commissioner of Patents, Washington, D. C."